June 20, 1933. D. FRENCH 1,915,058
ANTIVIBRATION MECHANISM FOR BLOWER CASINGS
Filed Oct. 4, 1929
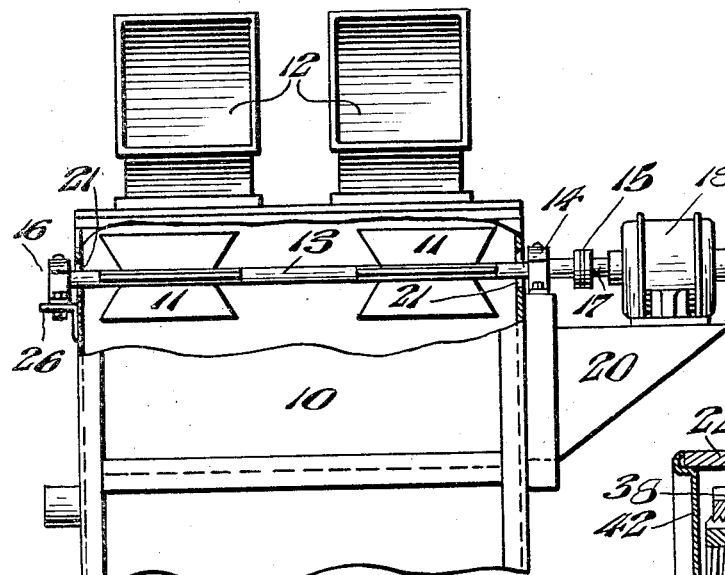
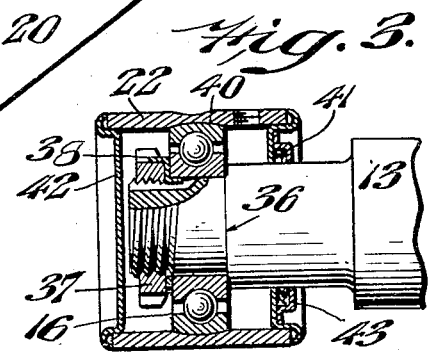
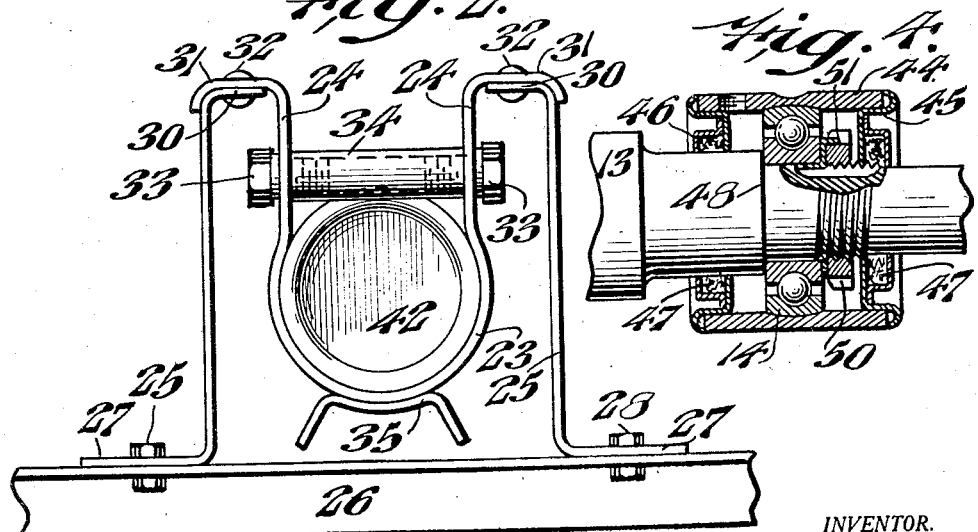
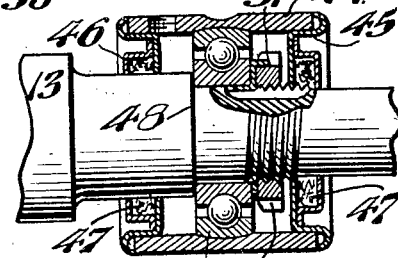
INVENTOR.
Donald French,
BY Robert M. Barr.
ATTORNEY.

Patented June 20, 1933

1,915,058

UNITED STATES PATENT OFFICE

DONALD FRENCH, OF MERION, PENNSYLVANIA, ASSIGNOR, BY MESNE ASSIGNMENTS, TO CARRIER RESEARCH CORPORATION, OF NEWARK, NEW JERSEY, A CORPORATION OF NEW JERSEY

ANTIVIBRATION MECHANISM FOR BLOWER CASINGS

Application filed October 4, 1929. Serial No. 397,218.

The present invention relates to anti-vibration mountings for driven shafts and more particularly to a mounting arranged to be attached to a casing of a ventilating, heating, or other unit.

In blower mechanisms as heretofore constructed it has been found impractical to mount rotating parts directly upon the casing for the mechanism on account of the noise developed by the vibration of the rotating parts at high speed, and hence the more general practice is to provide bearing mountings for the driven shaft separate from the casing itself. Such separate mounting does not lend itself to complete self contained units of a portable type, such as unit heaters which are complete in themselves and ready for installation without special separate bearing support.

Some of the objects of the present invention are to provide an improved mounting for driven shafts wherein provision is made for eliminating vibration noises; to provide a support carried by a casing wherein a shaft is mounted in such a manner as to prevent vibration being transmitted to the casing; to provide a fan structure in combination with a casing wherein the noises incident to operation of the fan are reduced to a negligible minimum; to provide a shaft mounting wherein conditions of unbalance in the rotating parts are automatically compensated; and to provide other improvements as will hereinafter appear.

In the accompanying drawing, Fig. 1 represents a side elevation, partly broken away, of a portion of an air circulating unit embodying one form of the present invention; Fig. 2 represents an end elevation of a form of shaft mounting embodying the invention; Fig. 3 represents a section of one of the shaft bearings; and Fig. 4 represents a section of the other shaft bearing.

Referring to the drawing, one form of the present invenion is shown as applied to a casing 10 through which air is to be circulated by one or more fans 11 and discharged by way of the ducts 12 to the point of use. Usually the number of ducts 12 corresponds to the number of fans 11. The fans 11 are fixedly attached to a shaft 13 of a length to pass through the casing 10 and which is statically and dynamically balanced prior to mounting within the casing with which it is to be associated. As shown the shaft 13 projects at opposite ends of the casing 10, one end passing through a bearing 14 to enter a coupling 15, and the other end being journalled in a bearing 16. The coupling 15 is connected to the driving shaft 17 of a motor 18 which is mounted upon a bracket 20 fastened to and projecting laterally from the casing 10. The casing 10 is provided with shaft holes 21, each of greater diameter than the shaft 13 so as to provide sufficient clearance to prevent contact between the shaft 13 and the walls of the casing. It should be noted that the shaft 13 is a relatively long one and hence, unless properly supported, will be subject to considerable distortion and vibration when run at operating speeds.

For localizing vibration to the shaft 13, damping the effect of unbalance and preventing vibration from being transmitted to the casing 10, the bearings 14 and 16 for the shaft 13 are mounted in arc-shaped stirrups 23 preferably formed of spring material. Taking the bearing 16, by way of example, its housing 22 is of cylindrical shape to seat in its supporting stirrup 23 which is suspended by integral areas 24 from uprights 25 formed of spring material and supported by a bracket 26 fastened to the casing 10. The lower end of each upright is bent to form a base 27 seating upon the bracket 26 and to which it is rigidly made fast by a bolt 28, while the upper end is bent in the opposite direction to provide a support 30 upon which the laterally bent end 31 of the adjacent arm rests. The respective supports 30 and ends 31 are interconnected by rivets 32 and the joint can in addition be edge welded for greater security. The length of the uprights 25 is such as to support the stirrup 23 out of contact with adjacent parts so that this end of the shaft 13 is free floating within the limits of flexibility of the spring uprights 25. Also since the uprights 25 are mounted substantially vertically a maximum flexibility can be obtained for a given load capacity, and since the load acts directly downward through the uprights, spring fatigue cannot cause any vertical drop in the points of support and hence change in angularity of the shaft or misalignment of the flexible coupling is prevented. The stirrup 23 is rigidly clamped about the bearing housing 22 by stud bolts 33 passing through the arms 24 and respectively entering the threaded opposite ends of a spacer tube 34.

A saddle member 35 is fixed to the bottom of the stirrup 23 and normally has its supporting feet above and out of contact with the bracket 26. The function of the member 35 is to serve as an auxiliary support for the housing 22 and bearing 16 in case the stirrup or the uprights should break, since in that event it will drop to the bracket 26 and support the bearing without undue misalignment of the shaft 13.

The bearing 16, which is of the ball type is mounted in the housing 22 and is held against a shoulder 36 on the shaft 13 by a nut 37 and a lock washer 38. The outer face of the outer ball race is preferably shaped as an arc of a sphere to seat in a correspondingly curved groove 40 on the inner face of the housing 22 so that the bearing is capable of some self alignment. Suitable end caps 41 and 42 are welded or otherwise fastened to the housing 22 to close the respective ends thereof so that lubricant is sealed therein, which a packing washer 43 prevents leakage about the reduced end of the shaft 13.

The bearing 14 is also of the ball type mounted in its housing 44 in a similar self aligning manner while the ends of the housing 44 are respectively closed by caps 45 and 46 including packing washers 47 to prevent leakage. The bearing 14 is held against a shoulder 48 of the shaft 13 by a nut 50 and locking washer 51. The housing 44 of the bearing 14 is yieldingly suspended by a stirrup 23 from uprights 25 in the same manner as shown for the bearing 16, and thus the shaft 13 rides in bearings which support the load through vertical leaf spring members in direct compression but allowing the upper ends of the springs to oscillate in a transverse plane.

It will now be apparent that a mounting for a shaft has been devised which is attached to a part of a casing in such a manner that shaft vibrations are prevented from reaching the casing and the result is noiseless operation of the unit at all motor speeds. A flexible spring support for the free end of the motor shaft forms an important element of the vibrationless combination, in that it permits the shaft to self-align and find its own axis of rotation. The arrangement of the supporting uprights as straight flat bar springs positioned so that the greatest spring resistance opposes the load, gives the necessary flexibility, and ensures correct alignment of the shaft at all times. This is due to the fact that spring fatigue cannot result in sagging of the support.

Since the bearing support of the present invention preferably forms a part of a complete heating or cooling unit and coacts with the support on the casing of such unit it will be evident that shaft vibrations are prevented from reaching the casing and the result is noiseless operation of the unit at all operating motor speeds.

Having thus described my invention, I claim:

1. A vibration absorbing device comprising two uprights of spring material arranged for mounting upon a fixed basal support, a main support for said shaft between said uprights, means to suspend said main support from said uprights, and a supplemental support carried by said main support and normally inoperative as a support.

2. A vibration absorbing device comprising a stirrup arranged to receive a bearing for supporting one end of a shaft, and two spring members supporting said stirrup and arranged to be mounted upon a fixed support, each of said members having its greatest spring resistance arranged to oppose the weight of the supported part.

3. A vibration absorbing device comprising two uprights, each formed of straight flat bar spring material, means for anchoring the base of each upright to a fixed support, a suspension member having its ends respectively connected to the upper ends of said uprights, and a housing for a shaft bearing supported by said suspension member.

4. A vibration absorbing device comprising two uprights of spring material, means for anchoring the base of each upright to a fixed support, a suspension member having its ends respectively connected to the upper ends of said uprights, a housing supported by said suspension member, a bearing for a shaft in said housing, and means between said bearing and said housing permitting self alignment of said bearing in said housing.

5. The combination with a blower mechanism including a casing, a side opening in the casing, a driven shaft extending transversely of said casing and passing through said opening in out of contact relation with the casing, supports fixed respectively to opposite sides of said casing, vibration absorbing devices carried respectively by said supports, each of said devices consisting of two uprights of spring material and a stirrup suspended therebetween, and a bearing in each stirrup for supporting an end of said shaft whereby vibration of the driven shaft is not transmitted to the casing.

6. The combination with a blower mechanism including a casing having a side opening, a driven shaft extending transversely of said casing and passing through said opening in out of contact relation with the casing, supports fixed respectively to the casing, vibration absorbing devices carried respectively by said supports, each of said devices comprising two uprights of spring material, a stirrup therebetween, and a bearing in said stirrup for supporting an end of said shaft, each of said uprights having its greatest spring resistance opposing the weight of the supported shaft.

Signed at Philadelphia, county of Philadelphia, State of Pennsylvania, this 3d day of Oct., 1929.

DONALD FRENCH.